Dec. 4, 1928.
C. R. MABEE
1,693,612
MANUFACTURE OF LIVE STOCK FEEDS
Filed Sept. 23, 1925   2 Sheets-Sheet 1
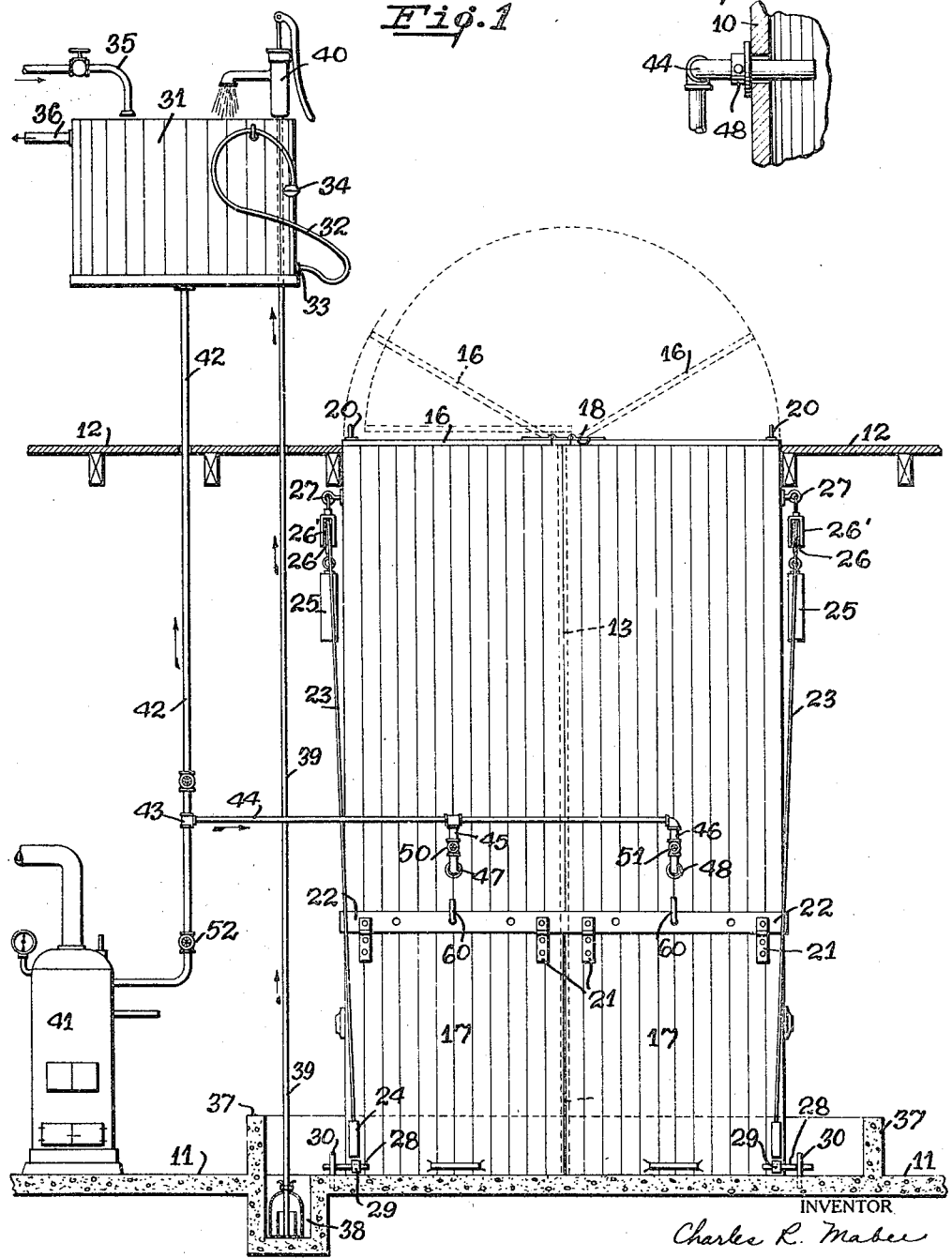
INVENTOR
Charles R. Mabee
BY
Mayer, Warfield & Watson
ATTORNEYS Dec. 4, 1928.
C. R. MABEE
1,693,612
MANUFACTURE OF LIVE STOCK FEEDS
Filed Sept. 23, 1925
2 Sheets-Sheet 2
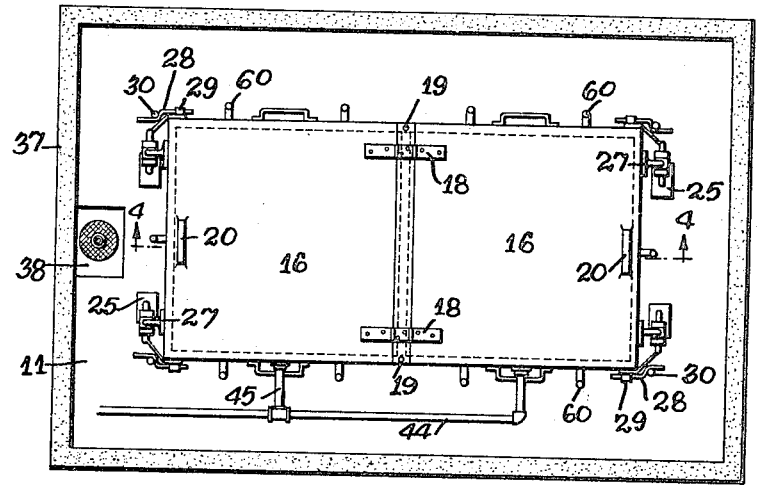
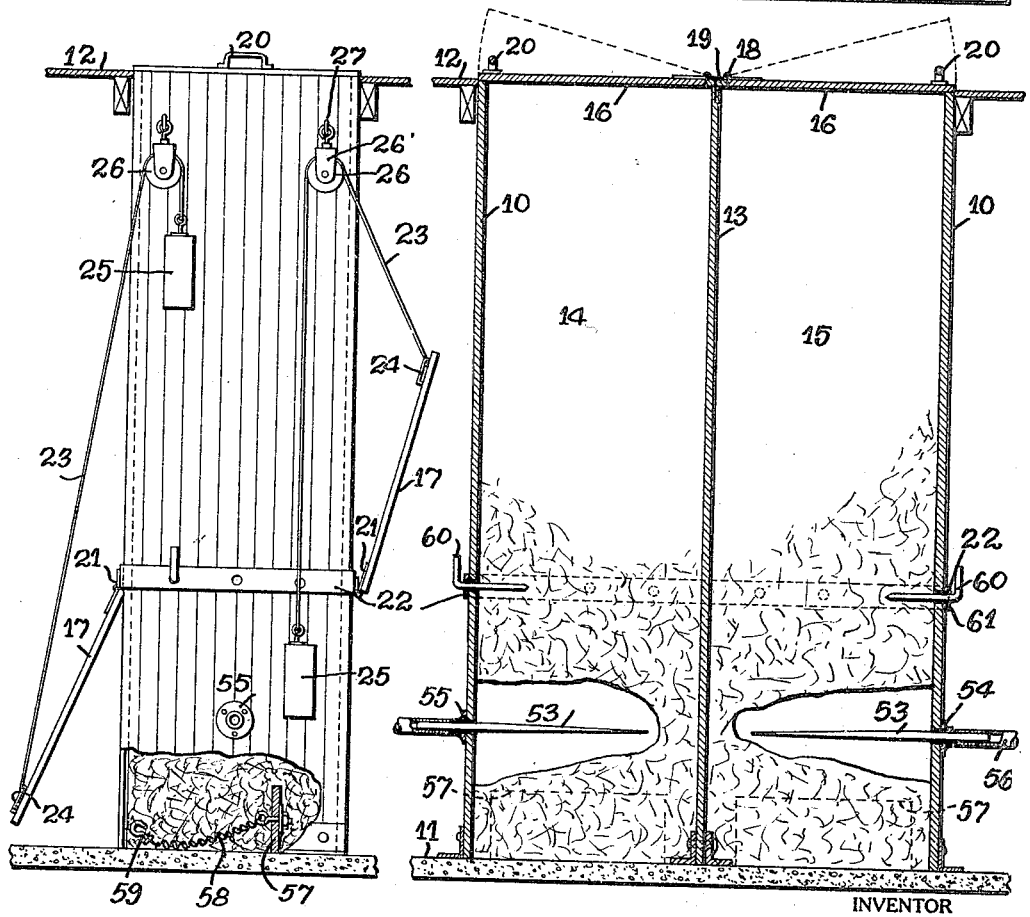
INVENTOR
Charles R. Mabee
BY
Mayer Warfield & Lewis
ATTORNEYS Patented Dec. 4, 1928.

1,693,612

UNITED STATES PATENT OFFICE.

CHARLES R. MABEE, OF BUFFALO, NEW YORK, ASSIGNOR TO MABEE PATENTS CORPORATION, OF DOVER, DELAWARE, A CORPORATION OF DELAWARE.

MANUFACTURE OF LIVESTOCK FEEDS.

Application filed September 23, 1925. Serial No. 58,126.

This invention relates to the manufacture of live stock feeds and more particularly to apparatus for the treatment of materials in the nature of farm roughage in the preparation of such feeds.

An object of the invention is to provide apparatus for the conversion of farm roughage which is efficient in operation and simple and economical of construction.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawing, in which:

Figure 1 is a side elevation of one type of conversion apparatus exemplifying the invention as installed for use;

Fig. 2 is a top plan view of a portion of the apparatus;

Fig. 3 is a side elevation taken at right angles to Fig. 1, parts of the apparatus being broken away to illustrate other parts thereof;

Fig. 4 is a cross sectional view taken along the line 4—4, in the direction of the arrows in Fig. 2; and Fig. 5 is a detail partly sectional view illustrating certain portions of the apparatus.

The invention contemplates the conversion of farm roughage, such as hay, straw, fodder, clover, vines and the like, so as to produce an appetizing, nourishing and easily digested feeding material and particularly the application of such treatment to comminuted dry farm roughage at or near the point of consumption of the feed. With this in view, apparatus is provided whereby roughage may be subjected to a fermentative or other conversion action in a container of a suitable type. As exemplified, the apparatus includes a receptacle 10 which extends upwardly from a floor 11 to a mow floor 12, and which in the present instance is rectangular in shape and is divided by means of a central partition 13 into compartments 14 and 15, each of which is adapted to serve as a container for an individual batch of roughage during conversion treatment. Obviously, by the employment of containers having contiguous faces, as provided by the compartments 14 and 15, heat applied to or evolved in the material under treatment in one container is readily communicated to material in an adjacent container. The upper ends of these containers are preferably open to permit the introduction therein of roughage held on the mow floor 12 and the lower portion of the side walls thereof are omitted on both sides of the receptacle 10, to permit the withdrawal of the treated roughage. It is often desirable, however, that the conversion treatment take place in a closed chamber, and to this end there are provided in the present instance a plurality of doors 16 to close the upper openings of the conversion compartments and a plurality of doors 17 to close the openings in the side walls thereof.

Each of the doors 16 is provided in the present instance with a plurality of hinges 18, by means of which it is attached to a crosspiece 19, forming a part of the receptacle and disposed above the partition 13, so that either door may be swung by means of a handle 20 to an open position above the other door to permit roughage from the mow floor 12 to be readily introduced into either compartment. Each of the doors 17 is provided with a plurality of hinges 21 whereby it is hung from a reinforcing band 22 extending about the receptacles. With a view to facilitating the opening of the latter doors and to maintaining the same in open position during the removal of the roughage, there is provided in connection with each door, in the present instance, a cable 23, fastened at one end to a staple 24 and at the other end to a counterweight 25 and extending over a pulley-wheel 26, which is supported from the receptacle by suitable means, as by a saddle 26' hanging from a screw ring 27.

In order that the doors 17 may be maintained in a tightly closed position, so as to provide a substantially air-tight chamber during the treatment of the roughage, there is provided in connection with each of these doors a pin 28 carried by a stud 29 and arranged therein to be slid behind a pin 30 mounted in the floor 11, so as to lock the door in closed position.

When dry farm roughage is employed, it is desirable to moisten the same either before, after, or during its introduction into the conversion chamber, so as to encourage the fermentative action of inherent or added ferments, upon which the conversion treatment ordinarily depends. To this end, there is provided in the present instance a liquid container or tank 31, which as exemplified, is positioned a sufficient distance above the mow floor 12 so as to permit liquid therefrom to be sprayed either upon roughage on the mow floor or roughage in either compartment of the receptacle, and the tank 31 is provided in the present exemplification with a hose 32 connected to the base of the tank at 33, and provided with a suitable nozzle 34. Any suitable liquid, such as water, may be employed to moisten the roughage, and, if desired, suitable ferments such as malt, yeast, fermented cereals and the like, and/or other materials which may be advantageous in the treatment, may be mixed with water or other liquid and the mixture sprayed on the roughage. A suitable inlet pipe 35 and an escape pipe 36 for the tank 31 may be provided if desired. Liquid from the tank 31 may be sprayed upon the roughage either before, during or after introduction thereof into the conversion chamber. In the preferred mode of operation the roughage is moistened as it is introduced into the container, after which it is packed, as by tramping, and additional moisture is subsequently sprayed thereupon. In order to collect any excess moisture which seeps through the material under treatment and to prevent the wastage thereof, the base of the receptacle is surrounded by a wall 37 extending upwardly from the floor 11, and the floor 11 is formed with a depression positioned inside this wall and so as to provide a well 38 for collecting the excess liquid. Suitable means, such as a pipe 39 and a pump 40, may be provided to return liquid from the well 38 to the tank 31. If desired means may be provided for conducting the liquid from a pump such as 40, either directly to roughage on the mow floor or directly to roughage in the container, so that the liquid collected in the well 38 may be sprayed upon the roughage and the tank 31 omitted.

The liquid employed to moisten the roughage may be at room temperature; but, inasmuch as fermentative actions as a general rule proceed more rapidly at somewhat higher temperatures, it is often desirable either to heat the liquid in the tank 31 or to introduce hot water, steam or other hot fluid medium into the conversion chamber during the treatment. To this end there is provided in the present instance a heater or boiler 41, the liquid chamber of which is connected to the tank 31 by means of a pipe 42, and this pipe 42 is formed at 43 with a T, from which extends a pipe 44, branch pipes 45 and 46 extending through openings 47 and 48 in the walls of the receptacle, and connected to the pipe 44. The openings 47 and 48 are so positioned in the exemplified apparatus as to be adjacent the central portions of the compartments 14 and 15 respectively, and are preferably of a somewhat greater diameter than the pipes 45 and 46, so as to permit these pipes to be readily inserted and withdrawn, suitable washers being employed to close these openings tightly. By means of these pipe connections, a hot fluid from the heater 41 may be conducted to the tank 31 to heat the liquid therein or to the material under treatment in either compartment, as indicated by the arrows in Fig. 1. In order that the flow of fluid from the heater 41 may be cut off either from the tank 31 or from one or both of the compartments 14 and 15, valves 49, 50 and 51 are provided in the pipes 42, 45 and 46 respectively. In certain cases, moreover, it may be desirable to introduce liquid from the tank 31 directly into the material under treatment in the conversion chambers, and to this end there is provided a valve 52 below the T 43 in the pipe 42, whereby the heater 41 may be cut off from the pipe system, so that when the valve 49 and either the valve 50 or the valve 51 is open a direct flow of fluid from the tank 31 into either the compartment 14 or the compartment 15 may be obtained.

After the roughage has been held in either conversion container for a sufficient length of time to allow the ferments to act and to permit the roughage to be converted to the desired extent, either or both of the doors 17 of the exemplified containers may be opened and the treated material withdrawn through either or both doorways. Considerable difficulty is often experienced, however, in removing the roughage at the base of the container, both because of the packing to which it has been subjected and to the natural cohesiveness of the moistened roughage, and also because of the weight of the superposed roughage in the container. Accordingly, in order to facilitate the removal of the treated roughage, there is provided means for loosening the packed roughage prior to its removal. In the present instance, this means consists of a lever member, such as exemplified in Fig. 4, and comprising a bar or prong 53 arranged to be extended through an orifice in one of the side walls of the receptacle, such as indicated at 54 and 55, and to be rocked therein, the sides of the orifice serving as a fulcrum for the lever. If desired, the prong may be provided with a handle, such as indicated at 56. The exemplified apparatus also includes means whereby the lateral displacement of the loosened roughage may be accomplished, which means consists, in the present instance, of a displacement member 57 to which is attached a chain 58 having a hook 59 at its outer end. The member 57 is arranged to be placed in an upright position in the bottom of either container (as shown in Figs. 2 and 4) before the introduction of roughage, with the hook 59 adjacent one of the doorways. When it is desired to withdraw the roughage from the container, therefore, all that is necessary to accomplish this result is to attach a suitable tackle arrangement to the hook 59 and to cause the member 57 to bear laterally upon the lower portion of the mass of treated roughage to press the same outwardly through the doorway. In order to relieve a certain amount of the pressure of the roughage in the top of the container on the lower portion of the mass of roughage, and in order to permit any portion of the roughage in the upper part of the container to be released at will into the lower part thereof, each of the containers may be provided with a plurality of pins 60, which are arranged to be inserted through openings, such as indicated at 61, in a band 22 and the side walls of the receptacle, and to extend any desired distance into the mass of roughage. One or more of these pins may thereafter be withdrawn at any time to release any portion of the roughage in the upper part of either of the containers.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. Apparatus for the treatment of farm roughage including a vertical container, means at the top of the container to permit the introduction of roughage therein, means at the bottom of the container to permit the withdrawal of treated roughage therefrom, means to loosen a packed mass of treated roughage adjacent the base of the container and means positioned above said loosening means releasably to support a mass of roughage in said container above the aforesaid mass.

2. Apparatus for the treatment of farm roughage including a vertical container, means at the top of the container to permit the introduction of roughage therein, means at the bottom of the container to permit the withdrawal of treated roughage therefrom, means to cause the lateral displacement of a mass of roughage adjacent the base of said container whereby to effectuate the withdrawal of roughage from the container and means releasably to support a mass of roughage in said container above the means for causing the displacement of the roughage.

3. Apparatus for the treatment of farm roughage including a vertical container, means at the top of the container to permit the introduction of roughage therein, means at the bottom of the container to permit the withdrawal of treated roughage therefrom, lever means associated with one of the walls of said container for loosening a packed mass of roughage in the lower portion of said container, means to cause a lateral displacement of a mass of roughage in the bottom of said container whereby to effectuate the withdrawal of roughage from the container, and means associated with certain of the walls of said container at a position above said loosening means and said displacement means releasably to support a mass of roughage above the same.

4. Apparatus for the treatment of farm roughage including a vertical container, means at the top of the container to permit the introduction of the roughage therein, means at the bottom of the container to permit the withdrawal of roughage therefrom, a lever extending through one of the walls of said container for loosening a packed mass of roughage in the lower portion thereof, and removable pins extending through certain of the walls and extending into the interior of the container at a point above said lever releasably to support material within said container.

In testimony whereof I affix my signature.

CHARLES R. MABEE.